Aug. 2, 1966 R. W. WEIDHAAS ETAL 3,263,371
RUBBER SHEET SPLICING MACHINE
Filed April 3, 1963

INVENTORS
ROBERT W. WEIDHAAS
JOHN B. FURIONI
BY
*Robert Hmerthater*
ATTORNEY

United States Patent Office 3,263,371
Patented August 2, 1966

3,263,371
RUBBER SHEET SPLICING MACHINE
Robert W. Weidhaas and John B. Furioni, Easthampton, Mass., assignors to United Elastic Corporation, Easthampton, Mass., a corporation of Massachusetts
Filed Apr. 3, 1963, Ser. No. 270,281
4 Claims. (Cl. 51—34)

This invention relates to a sheet splicer and a process of splicing.

A considerable problem is raised in the splicing of wide long sheets of material, such as rubber, which is to be slitted to form threads. It is not practical to make these sheets, which may be as much as 48 inches wide, of indefinite length and therefore it is desirable to splice a number of sheets together to obtain longer lengths. In the past this has been done by hand, it being necessary to bevel carefully each sheet and to cement the beveled edges together. When the operation is performed with precision a good splice results, however it is very difficult to handle the wide sheets and even where perfect splices are made the time taken is excessive which adds to the labor cost of producing the long sheets.

The present invention is primarily concerned with a machine which cuts and scuffs the beveled edges for the two sheets and which more or less automatically produces perfect bevels every time. The only hand labor required, apart from feeding the sheets to the machine initially, is in the sticking together the beveled or scuffed sheets. This is comparatively much easier than cutting perfect bevels in the soft material but in a more specific process aspect of the present invention improved methods are introduced into this part of the procedure.

The present invention is primarily useful in splicing rubber sheets. However it should be understood that the machine is suitable for splicing any type of sheet which is capable of being beveled. Therefore in the further description of the invention reference will be made to a rubber sheet, it being understood that the invention is not limited to processing this particular material although in a preferred aspect the process features of the present invention are directed to the specific problem of rubber sheet splicing.

Figure 1:
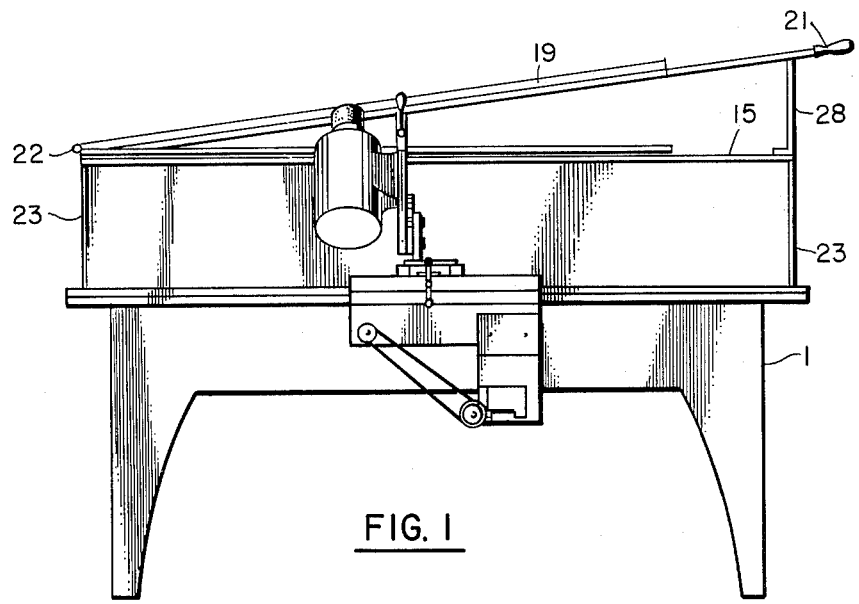
Figure 2:
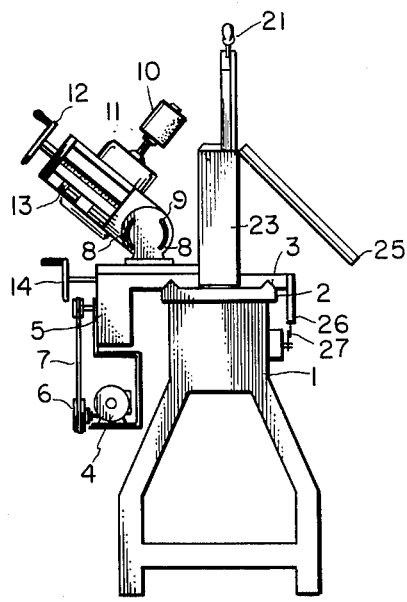
Figure 3:
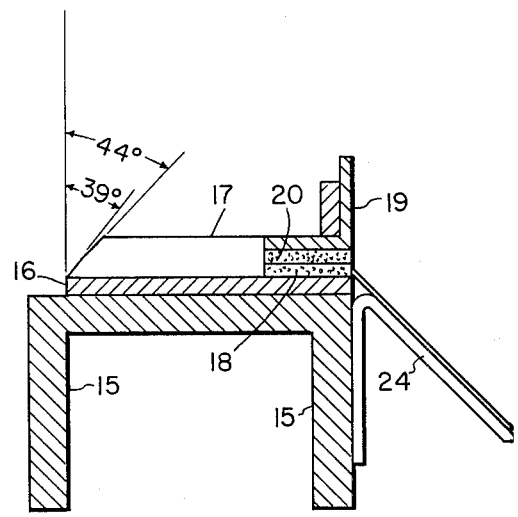

The invention will be described in greater detail in conjunction with the drawings in which:

FIG. 1 is a front elevation of the machine;
FIG. 2 is an end elevation, and
FIG. 3 is an enlarged detail of the scuffing pad and hold down arm.

The machine is built on a lathe bed 1 with suitable rails 2 on which a lathe carriage 3 moves. This carriage is moved by a slow geared motor which turns for example about 43.8 r.p.m. This motor is shown at 4 and drives through a torque release sprocket 6 and chain 7, a lateral carriage drive 5.

The carriage 3 is provided with an angular adjusting plate having curved slots 8 and bolts 9. This plate serves to adjust the angle at which is held a motor 11 driving a sanding drum 10. The position of the motor 10 and its mounting is controlled by the manual adjustment 12 and can be then locked by the locking screw 13. Manual adjustment 14 then results in a compound adjustment.

At the ends of the lathe bed are angle supports 23 supporting a flat bed 15 extending the full length of the lathe bed. While these supports and bed are separate elements they can be an integral bent plate as is shown in FIGURES 1 and 3. On the flat plate 15 there is carried a level plate 16 on which is mounted a scuffing pad 17 of firm but resilient material such as a polyurethane plastic. One edge of the scuffing pad is given a double bevel, the lower part being beveled at 39° and the upper part at 44° as is shown in FIGURE 3. At the other edge the scuffing pad butts against a layer of foam rubber 18 which is fastened to the plate 16. A channel hold down arm 19 provided with a second foam rubber pad 20 is hinged at 22 (FIG. 1) and the two pads can be brought into engagement as is shown in FIGURE 3. The hold down arm is provided with a handle 21 and can be held in a raised position by a rest 28 (FIG. 1). On the side of the channel 15 extends a guide shelf 24 with a guiding edge 25 which is shown in FIGURE 2.

The operation of splicing rubber sheets will now be described. A rubber sheet, for example 48 inches wide and 150 feet long, is pulled up over the shelf 24 with its edge accurately guided by the edge guide 25. The hold down arm is raised onto its rest 24 so that the end of the sheet can be pulled over three inches to the edge of the scuffing pad 17. The hold down arm 19 is then moved down and the two foam rubber pads 18 and 20 can grip the rubber sheet tightly. The extending end of the sheet is then folded back over the hold down arm and the scuffing pad at the other side of the sheet carefully cleaned with a suitable liquid such as heptane. Then a double faced masking tape is applied to the scuffing pad with one edge of the tape even with the leading edge of the bevel. The tape is carefully rolled down so that it is securely stuck all along the length of the bevel and flat face. The backing paper is then pulled off the masking tape and the rubber sheet which is folded back over the edge of the hold down arm now carefully smoothed on to the masking tape and rolled onto the bevel with a steel roll starting in the center and rolling toward the ends carefully eliminating all air bubbles. In a similar manner the rubber sheet is rolled onto the flat surface of the scuffing pad. At this point a scuffing drum 10 is at the extreme left hand end of the lathe bed and it is set by means of adjustment 12 until it is one-half the thickness of the rubber sheet from the 44° bevel edge of the scuffing pad.

The motors are then started and the drum 10 moves across slowly to make a complete pass to the right. An extension 26 on the carriage actuates a microswitch 27 at the end of the pass and the motor 4 is reversed bringing the sanding head back to the extreme left where a second microswitch (not shown) then stops it.

The edge of the rubber sheet along the edge of the scuffing pad is then trimmed off with a very sharp knife or razor blade, care being taken to produce a perfectly straight cut. The sheet and masking tape are then carefully peeled off the scuffing pad, care being taken that the masking tape still adheres firmly and uniformly to the rubber sheet. The edge of the sheet and tape are then stuck to a piece of flat steel, ¼" by 2" by 51".

A second rubber sheet is then scuffed as described above and placed on a second flat steel piece. Both of the scuffed edges are then coated with rubber cement and one rubber sheet removed from the flat plate with the tape still attached. The scuffed face is then applied to the scuffed face of the sheet still attached to its flat stock, the edges being carefully lined up and then the two sheets put together and rolled. After time for drying the masking tape is peeled off and leaves a completed splice.

It will be noted that the machine of the present invention produces rapidly and with complete accuracy a bevel edge that is perfect both as to bevel and length of the beveled edge. When two such perfect edges on their flat steel supports are coated and one fastened to the other the splice is made with ease because the difficult problem is not in sticking the two ends of the sheets together but in accurately cutting the beveled edges by hand. The present invention therefore carries out the difficult problem rapidly and with a precision which cannot be equalled except by the most careful and skilled operator. The time saved is of course very great.

It should be noted that the machine produces a beveled edge which is both true and roughened, whereas when a bevel is cut by hand with a knife, even if it is done perfectly, it is then necessary to perform a separate function of roughening the cut. Both of these functions are performed simultaneously by the machine and with an accuracy which is difficult to approach by hand operation.

We claim:
1. A splicing machine comprising in combination,
 (a) a bed with an accurate horizontal extent said bed carrying rails,
 (b) a moveable carriage riding on the rails,
 (c) means for laterally moving the carriage along the rails at a slow speed,
 (d) a mounting carried by the carriage in which is mounted a motor and a sanding drum,
 (e) means for adjusting the angle of said motor with respect to the horizontal and the distance from the carriage,
 (f) a flat plate extending parallel to and above the bed adjacent to the sanding drum and provided with mountings to the bed at the ends thereof,
 (g) a firm but resilient scuff pad on said plate having and edge toward the sanding drum beveled, the controls of the sanding drum being capable of positioning the drum parallel to the bevel and at predetermined distance therefrom,
 (h) a hold down arm pivoted on the bed and extending parallel to the plate,
 (i) resilient gripping pads on the plate and on the hold down arm parallel to each other whereby on lowering the hold down arm sheet material can be firmly clamped between the pads.

2. A machine according to claim 1 in which the scuffing pad is provided with two bevels, the first bevel from edge of the pad being slightly less than the second so that the pad is beveled first at a lower bevel and for the rest of its width at a slightly greater bevel.

3. A machine according to claim 1 in which means are provided, actuated by carriage travel, to shut off its travel at extreme positions of the carriage.

4. A machine according to claim 1 in which the plate carrying the scuffing pad is provided with a guide shelf extending along its rear edge and with an edge guide for aligning edges of sheet material thereon.

References Cited by the Examiner

UNITED STATES PATENTS

| | | | |
|---|---|---|---|
| 1,899,067 | 2/1933 | Trumbull | 156—304 XR |
| 1,905,365 | 4/1933 | Carlin | 156—122 XR |
| 1,998,633 | 4/1935 | Nichols | 156—122 |
| 2,298,496 | 10/1942 | Metzger | 51—98 |
| 2,23,571 | 12/1952 | Webber | 156—247 XR |
| 2,806,329 | 9/1957 | Amrhein et al. | 51—60 |
| 3,100,731 | 8/1963 | Brey | 156—304 XR |
| 3,120,723 | 2/1964 | Jessup | 51—60 |

EARL M. BERGERT, *Primary Examiner.*
HAROLD ANSHER, *Examiner.*